United States Patent [19]

van Erven

[11] 4,376,748
[45] Mar. 15, 1983

[54] METHOD AND APPARATUS FOR FORMING A PLATE WITH AT LEAST ONE PROFILED BORDER

[76] Inventor: Waltherus J. van Erven, Grote Voort 6a, 5081 HE Hilvarenbeek, Netherlands

[21] Appl. No.: 276,370

[22] PCT Filed: Nov. 6, 1980

[86] PCT No.: PCT/NL80/00036
 § 371 Date: Jun. 19, 1981
 § 102(e) Date: Jun. 19, 1981

[87] PCT Pub. No.: WO81/01263
 PCT Pub. Date: May 14, 1981

[30] Foreign Application Priority Data

Nov. 7, 1979 [NL] Netherlands .......................... 7908139

[51] Int. Cl.³ .......................... B29C 17/02; B29G 3/00
[52] U.S. Cl. .................................... 264/255; 156/216; 156/223; 264/512; 264/261; 264/320; 425/812
[58] Field of Search ............... 264/261, 263, 339, 322, 264/250, 255, 320, 294, 296, 500, 512; 156/242, 216, 299, 223, 222, 273

[56] References Cited

U.S. PATENT DOCUMENTS

| | | | |
|---|---|---|---|
| 2,500,895 | 3/1950 | Davies | 156/216 |
| 2,648,370 | 8/1953 | Beach | 264/322 |
| 2,739,636 | 3/1956 | Tyler | 156/399 |
| 2,744,850 | 5/1956 | Schofield | 264/339 |
| 2,854,373 | 9/1958 | Beach | 156/399 |
| 2,890,919 | 6/1959 | Hansen | 156/216 |
| 3,352,080 | 11/1967 | Rondum | 264/275 |
| 3,392,074 | 7/1968 | Bartron | 156/216 |
| 3,393,107 | 7/1968 | Wilburn | 156/242 |
| 3,668,033 | 6/1972 | Evans | 156/216 |
| 3,759,644 | 9/1973 | Ladney, Jr. | 425/129 |

FOREIGN PATENT DOCUMENTS

| | | |
|---|---|---|
| 2044416 | 6/1972 | Fed. Rep. of Germany . |
| 2117070 | 10/1972 | Fed. Rep. of Germany . |
| 2129828 | 1/1973 | Fed. Rep. of Germany . |
| 2516457 | 10/1976 | Fed. Rep. of Germany . |
| 2324438 | 4/1977 | France . |
| 2349441 | 11/1977 | France . |

*Primary Examiner*—Willard E. Hoag
*Attorney, Agent, or Firm*—Diller, Ramik & Wight

[57] ABSTRACT

A method of forming a slab having at least one profiled edge comprising a base sheet and a cover sheet connected herewith, the cover sheet being partly connected with the base sheet in a manner such that a peripheral part of the cover sheet protrudes beyond the edge of the base sheet, in the proximity of which the profiled edge has to be formed, comprising positioning of the base sheet with the cover plate partly connected herewith with respect to a mould having the profile of the profiled edge and nestling an outer surface of the peripheral part of the cover sheet against the mold, filling out a space bounded by the peripheral part of the cover sheet and the edge of the base sheet with curable filling means adhering to the two sheets, curing of the filling agent and removing the slab from the mold.

8 Claims, 12 Drawing Figures

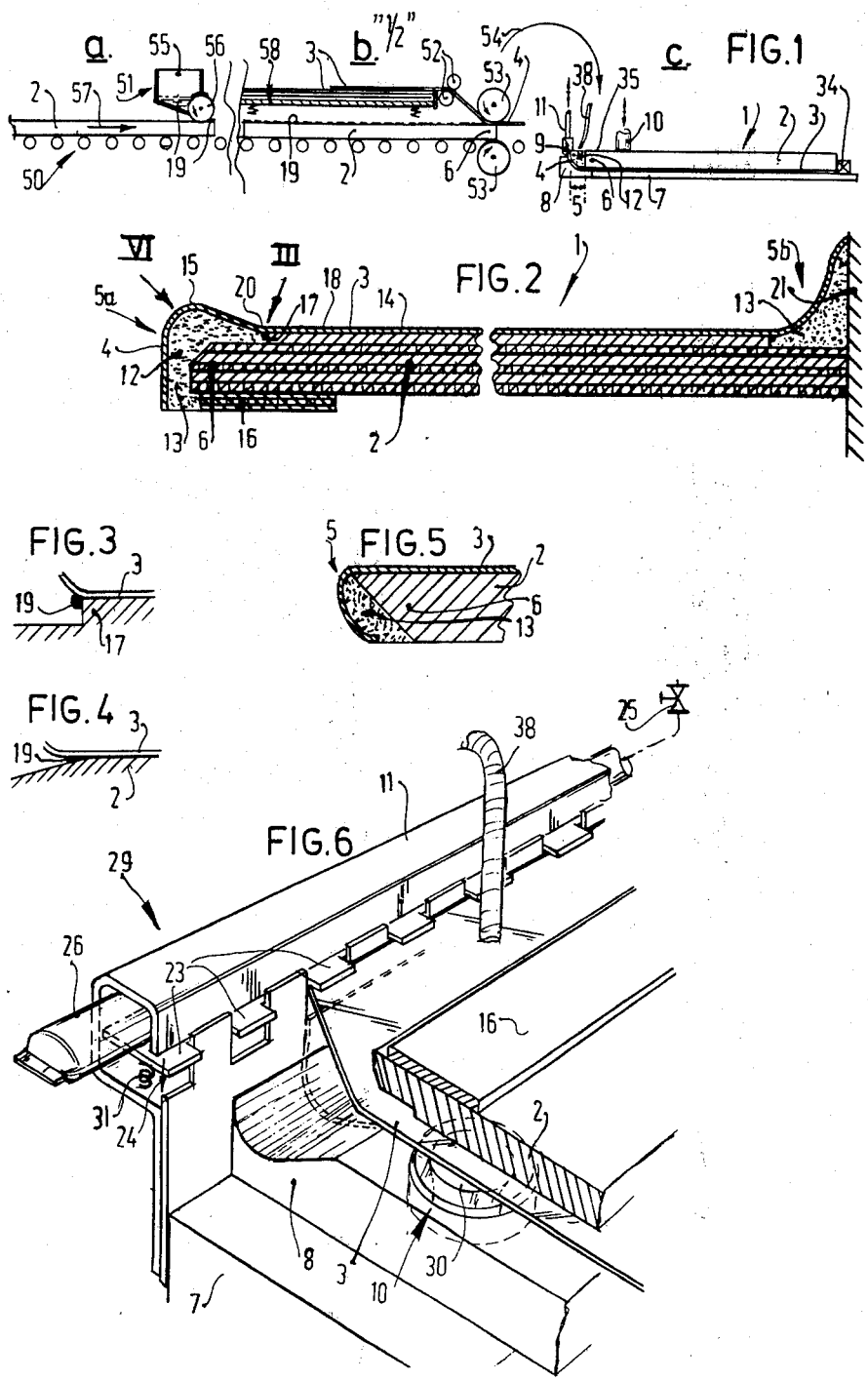

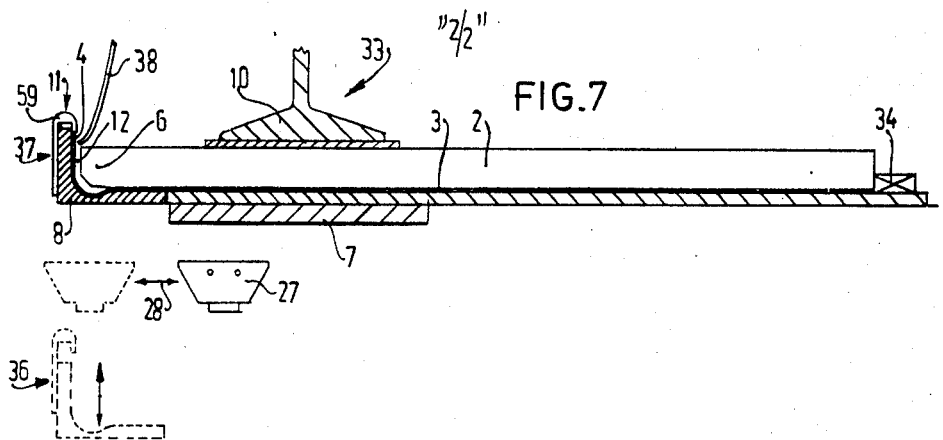
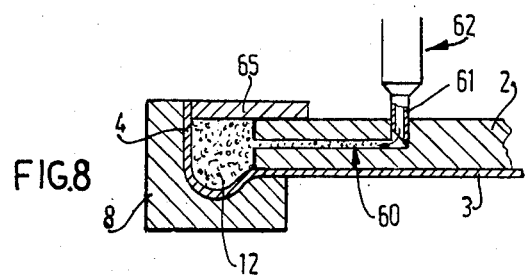
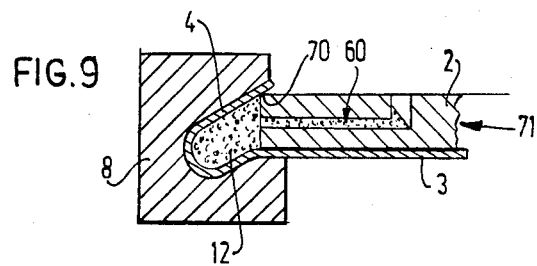
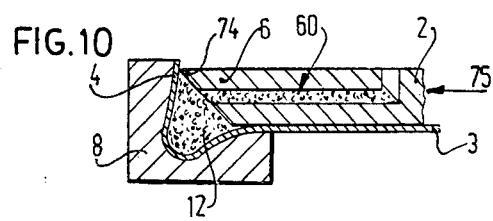

METHOD AND APPARATUS FOR FORMING A PLATE WITH AT LEAST ONE PROFILED BORDER

The invention relates to a method of forming a slab having at least one profiled edge, said slab comprising a base sheet and a cover sheet connected herewith, the cover sheet being partly connected with the base plate in a manner such that a peripheral part of the cover sheet protrudes beyond the edge of the base sheet in the proximity of which the profiled edge has to be formed.

Such a method is known from U.S. Pat. No. 3,392,074. Herein a filling piece having the profile of the profiled edge is arranged at the edge of the base sheet, after which the cover sheet is glued to the filling piece under pressure. A disadvantage of this method is that due to the curved face of the profiled edge it is particularly difficult to ensure that during gluing the pressure should be everywhere sufficiently high. If the pressure is not sufficiently high, the glue connection becomes locally defective and hence the cover sheet will not satisfactorily join the filling piece. Where the junction is not satisfactory, the cover sheet may readily crack when struck. Moreover, the insufficiently joined parts may form bubbles in the course of time and under the influence of heat. A further disadvantage resides in that the insert is expensive because it has to be of hard wood in order to ensure adequate resistance to strokes on the profiled edge, and it has to be milled into the desired profile.

The invention has for its object to manufacture such a slab in a simpler manner so that the occurrence of non-joining parts of the cover sheet is avoided. According to the invention this is achieved by a method comprising the following successive steps:

a. positioning of the base sheet with the cover sheet partly connected herewith with respect to a mold having the profile of the profiled edge and nestling an outer face of the peripheral part of the cover sheet against said mold, b. filling out the space bounded by the peripheral part of the cover sheet and the edge of the base sheet with curable filling agent adhering to the two sheets, c. allowing the filling agent to cure and d. removing the slab out of the mold.

Because the filling agent is introduced into the space in the liquid state, it comes into contact with the entire surface of the cover plate bounding said space so that subsequent to curing of the filling agent there are no non-joining parts. Since the cumbersome arrangement of the filling piece on the base sheet is avoided, the method according to the invention is materially simpler. For this reason and because no expensive, profiled hardwood insert is required, the ready slab is appreciably cheaper.

By causing the edge of the base sheet to project into the profiled edge, filling agent can advantageously be saved. This effect is further enhanced by roughly profiling the edge according to the profile of the profiled edge so that the space between the edge of the base sheet and the peripheral part of the cover sheet is small.

When the step defined in claim 4 is used, the head edge of the connecting face between the base sheet and the cover sheet becomes a straight line so that, when the profiled edge has a bend directly from said head edge, it will also extend along a straight line.

The method is advantageously employed for manufacturing a kitchen dresser slab or the like, in which the base sheet is a plywood or wood fibre sheet and the cover sheet is a thermo-hardening synthetic resin sheet of a post-formable type. The curing process therein is not yet completed and by heating the cover sheet it can still once be plastically deformed.

The method according to the invention is particularly suitable for manufacturing a kitchen dresser slab with a water-arresting rim.

To attain a swift fabrication and a good filling of the space, the curable filling agent is preferably pressure fed into the space between the cover sheet and the base sheet.

The invention relates furthermore to and provides a device for molding a slab having at least one profiled edge, said device comprising a connecting device connecting a cover sheet partly with a base sheet in a manner such that beyond the edge of the base sheet, in the proximity of which the profiled edge has to be formed, a peripheral part of the cover sheet protrudes and a table and, moreover, a mold connected with said table and having the profile of the profiled edge, holding means connected with said table for retaining the sheet on the table, positioning means for nestling the peripheral part of the cover sheet with an outer surface against the mould and a filling-agent supply device.

A preferred embodiment of the device according to the invention comprises heating means heating the peripheral part of the cover sheet so that post-formable, thermo-hardening sheet material can be used for the cover sheet.

It is particularly advantageous to have the mold movable with respect to the base sheet retained on the table so that during the process the base sheet with the cover sheet need not be shifted in place for nestling the peripheral part in the mold. Thus the risk of damage of the cover sheet during the manufacturing process is drastically reduced.

The abovementioned and further features of the invention will be explained in the following description with reference to the drawings.

The drawings show in:

FIGS. 1a, 1b, 1c schematically three phases of a slab by carrying out the method in accordance with the invention.

FIG. 2 a sectional view of a slab having two different profiled edges manufactured by carrying out the method in accordance with the invention, FIG. 3 on an enlarged scale a detail III of FIG. 2.

FIG. 4 a sectional view like FIG. 3 of a different embodiment of a profiled edge, FIG. 5 a sectional view of a different profiled edge, FIG. 6 a perspective view partly broken away and partly sectioned of a device in accordance with the invention for manufacturing a profiled edge according to detail VI in FIG. 2 and FIG. 7 a sectional view of a different embodiment of a device in accordance with the invention.

FIG. 8 an enlarged schematic sectional view corresponding to FIG. 7 of a device using a different method according to the invention, FIG. 9 a sectional view corresponding to FIG. 8 showing a different embodiment of a profiled edge.

FIG. 10 a sectional view corresponding to FIGS. 8 and 9, showing another different embodiment of a profiled edge.

FIGS. 1a, 1b, 1c illustrate the manufacture of a slab 1 in accordance with the invention. A conveyor device 50 supplies a base sheet 2. The base sheet 2 may be of wood, metal or synthetic resin. The gluing device 51 arranged above the conveyor device 50 supplies glue 19 from a reservoir 55 applied by a roller 56 to the base sheet 2, whilst this base sheet 2 is moved in the direction indicated by the arrow 57. In a further phase (FIG. 1b) a cover sheet 3 supplied from a stock holder 58 arranged above the conveyor device 50 is applied to the base sheet 2 provided with glue 19. The cover sheet 3 is taken out of the holder 58 by relatively co-operating transport rollers 52, which carry the cover sheet 3 towards the roller press 53, by which the cover sheet 3 is forcibly pressed onto the base sheet 2. The cover sheet 3 may be a foil, for example, a vinyl foil or a sheet of synthetic resin, veneer or metal. The cover sheet 3 is applied in a manner such that a peripheral part thereof protrudes beyond the edge of the base sheet 2. Subsequently the base sheet 2 with the cover sheet 3 partly bonded thereto is inverted (indicated symbolically by the arrow 54) and positioned on a table 7 against a stop 34 arranged at a given distance from a mold 8. The mold 8 has a profile corresponding with the desired profile of the profiled edge 5. The base sheet 2 is then clamped tight to the table 7 by means of holding members 10, which are movable towards the table 7 and can be fixed in a desired position relative to the table 7. In order to ensure that the outer surface of the peripheral part 4 is everywhere in satisfactory contact with the mold 8, stop means 11 movable with respect to the mold 8 are arranged for pressing the peripheral part 4 in the mold 8. The space 12 bounded by the peripheral part 4 of the cover sheet 3 and the edge 6 of the base sheet 2 is then filled with a curable filling agent 13 adhering to the two sheets. The filling agent 13 is supplied from a nozzle 38 of a filling-agent supply device (not shown). When the space 12 is completely filled up with the filling agent, the supply is stopped and the filling agent is allowed to cure. Subsequently the ready slab 1 can be removed out of the mold 8 and from the table 7 after the stop means 11 and the holding means 10 have been moved into a rest position at a distance from the slab 1. Any redundant filling agent protruding out of the surface 35 of the base sheet 2 is subsequently ground away.

FIG. 2 shows a slab 1 manufactured by the method according to the invention, which is intended for use as a kitchen dresser slab. This slab 1 has two profiled edges 5a and 5b. The profiled edge 5a on the left-hand side of FIG. 2 protrudes upwards from the top surface 14 of the slab 1. In this way a water-arresting rim 15 is formed to prevent water from flowing away from the slab 1 during use. In this case the base sheet 2 is made from plywood or compressed wood fibre. The cover plate 3 is a sheet of thermo-hardening synthetic resin of a postformable type. A property of this type is that the synthetic resin has not yet completely cured chemically, so that it can still once be rendered plastically deformable by heating it. Consequently, before the peripheral part 4 of the cover sheet 3 is nestled against the mold 8, it is heated.

FIG. 2 shows that a stand piece 16 is arranged on the base sheet 2 in order to obtain the desired height of the profiled edge 5a. At the area of the profiled edge 5a the shape of the edge 6 of the base sheet 2 is roughly adapted to the profile of the profiled edge 5a. As a result a smaller amount of filling agent 13 is required for filling out the space 12 between the peripheral part 4 of the cover sheet 3 and the edge 6 of the base sheet 2. In this embodiment the surface of the edge 6 merges through an interface 17 transverse of the connecting surface 18 of the base sheet 2 with the cover sheet 3 in said surface. This has the advantage that the glue 19, which is forced from between the base sheet 2 and the cover sheet 3 when the latter are joined, does not interconnect the sheets 3 and 2 more than is desired (see FIG. 3). Any further connection is, however, possible when the surface of the rim 6 joins the connecting surface 18 without a transverse interface 17 between the base sheet 2 and the cover plate 3, as is indicated in FIG. 4. If in the latter case at different places different amounts of glue 19 are pinched from between the sheets 2 and 3, as will occur in practice, the bend 20 of the cover sheet 3 will not form a straight line in the longitudinal direction of the slab 1 where it terminates in the water-arresting rim 15. This is avoided by the arrangement of the transverse interface 17.

A material particularly suitable for use as a filling agent is polyurethene resin. This material cures very rapidly owing to the chemical reaction between two constituents which are mixed directly prior to filling the space with material.

FIG. 5 shows a profiled edge 5, where the cover sheet 3 is bent back towards the edge 6 of the base sheet 2. Thus the profiled edge 5 has a finished appearance also in an inclined view from below.

FIG. 6 shows a device 29 for carrying out the method according to the invention. This device 29 is constructed for making a water-arresting rim as shown in FIG. 1c. Corresponding parts are designated by the same reference numerals and have the same function as in FIG. 1c. In this case the holding means 10 are formed by a plurality of suction pads 30, only one of which is shown. The suction pads 30 engage by vacuum the top surface 14 of smooth synthetic resin of the cover sheet 3. The stop means 11 are formed in this case by a first and a second comb-shaped member 22 and 23 respectively. The second comb-shaped member 23 protrudes into the first member 22 and can be moved in the direction indicated by the arrow 24 by allowing compressed air to flow through the duct 25 into the hose 26. During this movement the cover sheet 3 is forced into contact with the mold 8. The reverse direction is brought about by springs 31.

As stated above, the projecting peripheral part 4 of the thermo-hardening synthetic resin cover plate 3 has to be heated in order to render it deformable. In the embodiment shown in FIG. 6 the cover sheet 3 partly connected with the base sheet 2 is, to this end, positioned on the table 7 and the stop means 11 in a manner such that the peripheral part 4 protrudes out of the stop means 11. With the aid of heating means (not shown), the peripheral part 4 is subsequently brought to the desired temperature. The base sheet 2 with the cover sheet 3 is then moved to the correct place on the table 7 against a stop 34, after which the peripheral part 4 can be aligned to the mold 8 by the stop means 11. Since the filling agent supply device may be a device known per se it is not shown here; only the nozzle 38 thereof is schematically shown.

FIG. 7 finally shows schematically a preferred embodiment of the device 33 according to the invention, in which the mold 8 can be moved from the rest position 36 to the base sheet 2 clamped tight by the holding means 10 to the table 7 and being in contact with the stop 34 together with the cover plate 3 connected herewith and made from post-deformable, thermo-hardening synthetic resin into the operative position 37 with the aid of driving means (not shown). This embodiment comprises heating means for the peripheral part 4. After the peripheral part 4 is brought to the desired temperature and is therefore again deformable, said means 27 are moved away in the direction indicated by the arrow 28, after the mold 8 is nestled against the peripheral part 4 and the process is finished. The advantage of this device is that the base sheet 2 with the cover plate 3 partly connected herewith subsequent to heating of the peripheral part 4 need not be shifted in place with respect to the mold 8 so that the risk of damage of the cover plate 3 during the execution of the method is slight. In this embodiment the stop means 11 are formed by a profile 59 movable with respect to the mold 8 and guided thereby.

According to a preferred method the curable filling agent is pressure fed into the space 12. As shown in FIGS. 8–10 a filling channel 60 is drilled in the base sheet 2 beforehand. When the base sheet 2, with the heated cover sheet 3 is positioned in the mold 8, a closure plate 65 is arranged, closing the space 12. A nozzle 61 of an injection head 62 is connected to the channel 60. The injection head 62 forms a part of an apparatus known as such, for pressure injection of curable two-component material. In this way the space 12 is filled under pressure with the curable filling agent, whereby not only the space is very well filled, but also the peripheral part 4 is nested extra well in the mold 8. Instead of in the base sheet 3, the filling channel 60 can also be arranged in the closure plate 65.

For certain forms of the desired profiled edge, it is not necessary to use a closure plate 65. As FIG. 9 shows, a good closure of the space 12 can also be attained, by pressing the corner 70 of the base sheet 2 in the direction of the arrow 71, against the peripheral part 4 of the cover sheet 3, supported by the mold 8. As FIG. 10 shows, the edge 6 of the base sheet 3 can also be chamfered in such a way that a point 74 is being formed, that is pressed in the direction of arrow 75 against the peripheral part 4, to obtain a good closure.

I claim:
1. A method of forming a slab having at least one profiled edge comprising a base sheet and a cover sheet connected herewith, the cover sheet being partly connected with the base sheet in a manner such that a portion of the cover sheet protrudes beyond the edge of the base sheet, in the proximity of which the profiled edge is to be formed characterized by the following successive steps:
   a. positioning the base sheet, with a portion of the cover sheet in direct adhering contact with said base sheet such that a second portion of said sheet protrudes beyond the edge of said base sheet in a mold cavity having a desired configuration for forming said profiled edge and engaging a surface of said cover sheet remote from said base sheet against a mold wall defining said cavity, while deforming the protruding portion of said cover sheet out of its plane;
   b. filling out a space bounded by the protruding part of the cover sheet and the edge of the base sheet with curable filling material that adheres to the two sheets,
   c. curing of the filling material and
   d. removing the slab from the mold.
2. A method as claimed in claim 1, characterized by causing the edge of the base sheet to project into a mold part forming the profiled edge when positioning the base sheet with the cover sheet partly connected herewith with respect to the mold.
3. A method as claimed in claim 1 or 2, characterized in that before the cover sheet is connected with the base sheet the edge of the base sheet is roughly profiled in accordance with the profile of the profiled edge.
4. A method as claimed in claim 2 characterized in that before the cover sheet is connected with a bonding side of the base sheet, a groove is recessed in the area of its edge to be accommodated in a profiled edge of the sheet, said groove having an interface extending transversely of said side and joining said side.
5. A method as claimed in claims 1, 2 or 4 characterized in that as a base sheet is used a wooden sheet, for example, of plywood or compressed wood fibre.
6. A method as claimed in claims 1, 2 or 4 characterized in that as a cover sheet is used a thermo-hardening synthetic resin sheet of a postformable type.
7. A method as claimed in claims 1, 2 or 4 characterized in that the outer face of the protruding portion of the cover plate is nestled against a mold, the profile of which has the shape of a water-arresting rim.
8. A method as claimed in claims 1, 2 or 4 characterized in that the curable filling agent is pressure fed into the space between the cover sheet and the base sheet.

* * * * *